United States Patent
Black et al.

(10) Patent No.: US 10,333,217 B1
(45) Date of Patent: Jun. 25, 2019

(54) COMPOSITE BEAM FORMING WITH MULTIPLE INSTANCES OF HOLOGRAPHIC METASURFACE ANTENNAS

(71) Applicant: Pivotal Commware, Inc., Kirkland, WA (US)

(72) Inventors: Eric James Black, Bothell, WA (US); Alexander Remley Katko, Seattle, WA (US); Jay Howard McCandless, Alpine, CA (US)

(73) Assignee: Pivotal Commware, Inc., Kirkland, WA (US)

( * ) Notice: Subject to any disclaimer, the term of this patent is extended or adjusted under 35 U.S.C. 154(b) by 0 days.

(21) Appl. No.: 15/870,758

(22) Filed: Jan. 12, 2018

(51) Int. Cl.
| | |
|---|---|
| *H01Q 1/52* | (2006.01) |
| *H01Q 3/26* | (2006.01) |
| *H01Q 5/22* | (2015.01) |
| *H04W 16/28* | (2009.01) |

(52) U.S. Cl.
CPC .......... *H01Q 3/2676* (2013.01); *H01Q 1/523* (2013.01); *H01Q 5/22* (2015.01); *H04W 16/28* (2013.01)

(58) Field of Classification Search
CPC ........ G02F 1/218; G02F 1/0123; G02F 1/015; G02F 1/19; G02F 2001/0151; G02F 2001/0152; G02F 2203/02; G02B 26/001; H01Q 15/0086; H01Q 15/0066; H01Q 15/006; H01Q 1/36; H01Q 21/061; B82Y 20/00
USPC .................................................. 359/1–20, 34
See application file for complete search history.

(56) References Cited

U.S. PATENT DOCUMENTS

| | | |
|---|---|---|
| 7,205,949 B2 | 4/2007 | Turner |
| 9,356,356 B2 | 5/2016 | Change et al. |
| 9,385,435 B2 | 7/2016 | Bily et al. |
| 9,450,310 B2 | 9/2016 | Bily et al. |
| 9,711,852 B2 | 7/2017 | Chen et al. |
| 9,606,416 B2 | 10/2017 | Chen et al. |
| 9,806,414 B2 | 10/2017 | Chen et al. |
| 9,806,415 B2 | 10/2017 | Chen et al. |
| 9,812,779 B2 | 11/2017 | Chen et al. |
| 10,033,109 B1 | 7/2018 | Gummalla et al. |

(Continued)

FOREIGN PATENT DOCUMENTS

| | | |
|---|---|---|
| CN | 106797074 A | 5/2017 |
| WO | 2015196044 A1 | 12/2015 |

OTHER PUBLICATIONS

Jierong Cheng, Samad Jafar-Zanjani, and Hossein Mosallaei. Real-time two-dimensional beam steering with gate-tunable materials: a theoretical investigation. vol. 55, No. 22 /Aug. 1, 2016 /Applied Optics 6 (Year: 2016).*

(Continued)

*Primary Examiner* — Collin X Beatty
(74) *Attorney, Agent, or Firm* — John W. Branch; Lowe Graham Jones PLLC

(57) ABSTRACT

A method for beam forming includes providing multiple instances of holographic metasurface antennas (HMAs), a reference wave source coupled to the HMAs, and a hologram function for each of the HMAs; combining the object waves of the plurality of HMAs, generated in response to the reference wave, to produce a composite beam; and modifying a phase angle of the object wave from one or more of the HMAs by modifying the hologram function of the one or more HMAs in order to modify the composite beam.

30 Claims, 6 Drawing Sheets

(56) References Cited

U.S. PATENT DOCUMENTS

| | | |
|---|---|---|
| 2005/0237265 A1 | 10/2005 | Durham et al. |
| 2012/0194399 A1* | 8/2012 | Bily ................. H01Q 13/28 343/772 |
| 2014/0293904 A1 | 10/2014 | Dai et al. |
| 2015/0109178 A1 | 4/2015 | Hyde et al. |
| 2015/0162658 A1 | 6/2015 | Bowers et al. |
| 2015/0276926 A1 | 10/2015 | Bowers et al. |
| 2015/0372389 A1 | 12/2015 | Chen et al. |
| 2016/0149308 A1 | 5/2016 | Chen et al. |
| 2016/0149309 A1 | 5/2016 | Chen et al. |
| 2016/0149310 A1 | 5/2016 | Chen et al. |
| 2016/0164175 A1 | 6/2016 | Chen et al. |
| 2016/0302208 A1* | 10/2016 | Sturkovich .......... H04B 7/0617 |
| 2016/0345221 A1 | 11/2016 | Axmon et al. |
| 2017/0127295 A1 | 5/2017 | Black et al. |
| 2017/0127332 A1 | 5/2017 | Axmon et al. |
| 2017/0155193 A1 | 6/2017 | Black et al. |
| 2017/0187123 A1 | 6/2017 | Biack et al. |
| 2017/0187426 A1 | 6/2017 | Su et al. |
| 2017/0238141 A1 | 8/2017 | Lindoff et al. |
| 2017/0339575 A1 | 11/2017 | Kim et al. |
| 2018/0233821 A1 | 8/2018 | Pham et al. |
| 2018/0270729 A1 | 9/2018 | Ramachandra et al. |

OTHER PUBLICATIONS

Omri Wolf, et Al. Phased-Array Sources Based on Nonlinear Metamaterial Nanocavities. Nature Communications 6:7667 DOI: 10.1038/ncomms8667. 2015 Macmillan Publishers Limited. All rights reserved (Year: 2015).*

Office Communication for U.S. Appl. No. 15/925,612 dated Jun. 15, 2018, pp. 1-12.

U.S. Appl. No. 14/510,947, filed Oct. 9, 2014, pp. 1-76.

Office Communication for U.S. Appl. No. 16/136,119 dated Mar. 15, 2019, pp. 1-12.

Office Communication for U.S. Appl. No. 16/049,630 dated Oct. 4, 2018, pp. 1-17.

Office Communication for U.S. Appl. No. 16/136,119 dated Nov. 23, 2018, pp. 1-16.

* cited by examiner

COMPOSITE BEAM FORMING WITH MULTIPLE INSTANCES OF HOLOGRAPHIC METASURFACE ANTENNAS

TECHNICAL FIELD

The present invention relates generally to a beam forming system that utilizes multiple instances of holographic metasurface antennas. The present invention is also directed to systems and methods for modifying a composite beam by modifying a phase angle of an object wave generated by one or more of the holographic metasurface antennas.

BACKGROUND

The principal function of an antenna is to couple an electromagnetic wave guided within the antenna structure to an electromagnetic wave propagating in free space. Multiple antennas may be used together. However, electromagnetic waves from these antennas may interfere with each other which can reduce the effectiveness of the antenna. This interference can be particularly difficult to manage when an antenna includes a plurality of different elements to guide and propagate the electromagnetic waves.

DETAILED DESCRIPTION OF THE INVENTION

Figure 1A:
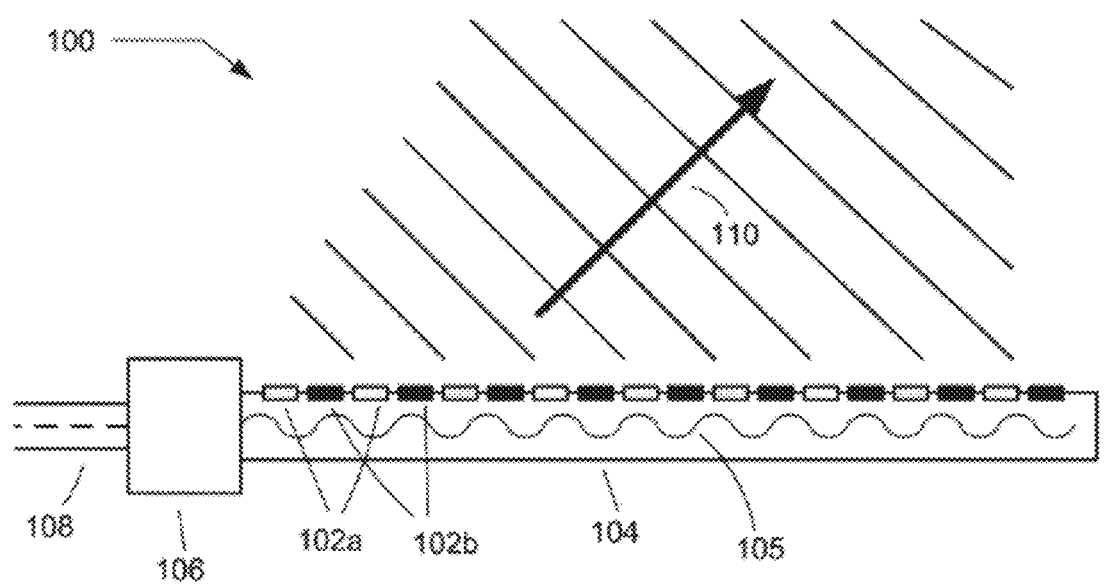
FIG. 1A shown an embodiment of an exemplary surface scattering antenna with multiple varactor elements arranged to propagate electromagnetic waves in such a way as to form an exemplary instance of holographic metasurface antennas (HMA)

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in at least one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a method, arrangement, or system for producing a composite beam produced by a combination of object waves emitted by multiple instances of HMAs. The composite beam is modified by modifying hologram functions for one or more of the multiple instances of HMAs. The hologram function of the HMA defines a response of scattering elements of the HMA to a reference wave, and by these responses generating an object wave which produces a far-field beam pattern. In one or more embodiments, a combination of beam patterns from multiple instances of HMAs can be modified by altering the initial hologram function of the one or more HMAs. The altered or second hologram function may adjust a phase angle of the object wave generated by the one or more HMAs to improve and/or dynamically adjust in real time the composite beam produced by the multiple instances of the HMAs.

In one or more embodiments, the first hologram function is typically arranged so that a HMA may emit an object wave in a desired pattern and strength at a predetermined distance. The altered or second hologram function may include adjustments to the phase angles of the object waves emitted by each of the HMAs to avoid cancellation effects. When the phase angles are coherent between the multiple instances of HMAs, their emitted object waves can add together instead of creating zero nodes at cross over points.

Illustrated Operating Environment

In one or more embodiments, a HMA may use an arrangement of controllable elements to produce an object wave. Also, in one or more embodiments, the controllable elements may employ individual electronic circuits, such as varactors, that have two or more different states. In this way, an object wave can be modified by changing the states of the electronic circuits for one or more of the controllable elements. A control function, such as a hologram function, can be employed to define a current state of the individual controllable elements for a particular object wave. In one or more embodiments, the hologram function can be predetermined or dynamically created in real time in response to various inputs and/or conditions. In one or more embodiments, a library of predetermined hologram functions may be provided. In the one or more embodiments, any type of HMA can be used to that is capable of producing the beams described herein.

FIG. 1A illustrates one embodiment of a HMA which takes the form of a surface scattering antenna 100 (i.e., a HMA) that includes multiple scattering elements 102a, 102b that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102a, 102b may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102a, 102b are adjustable scattering elements having electromagnetic properties that are adjustable in response to one or more external inputs. Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1A, scattering elements that have been adjusted to a first state having first electromagnetic properties are depicted as the first elements 102a, while scattering elements that have been adjusted to a second state having second electromagnetic properties are depicted as the second elements 102b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1A, the scattering elements 102a, 102b have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102a, 102b are responsive to the reference wave 105 to produce a plurality of scattered electromagnetic waves having amplitudes that are functions of (e.g. are proportional to) the respective first and second couplings. A superposition of the scattered electromagnetic waves comprises an electromagnetic wave that is depicted, in this example, as an object wave 110 that radiates from the surface scattering antenna 100.

FIG. 1A illustrates a one-dimensional array of scattering elements 102a, 102b. It will be understood that two- or three-dimensional arrays can also be used. In addition, these arrays can have different shapes. Moreover, the array illustrated in FIG. 1A is a regular array of scattering elements 102a, 102b with equidistant spacing between adjacent scattering elements, but it will be understood that other arrays may be irregular or may have different or variable spacing between adjacent scattering elements.

Figure 1B:
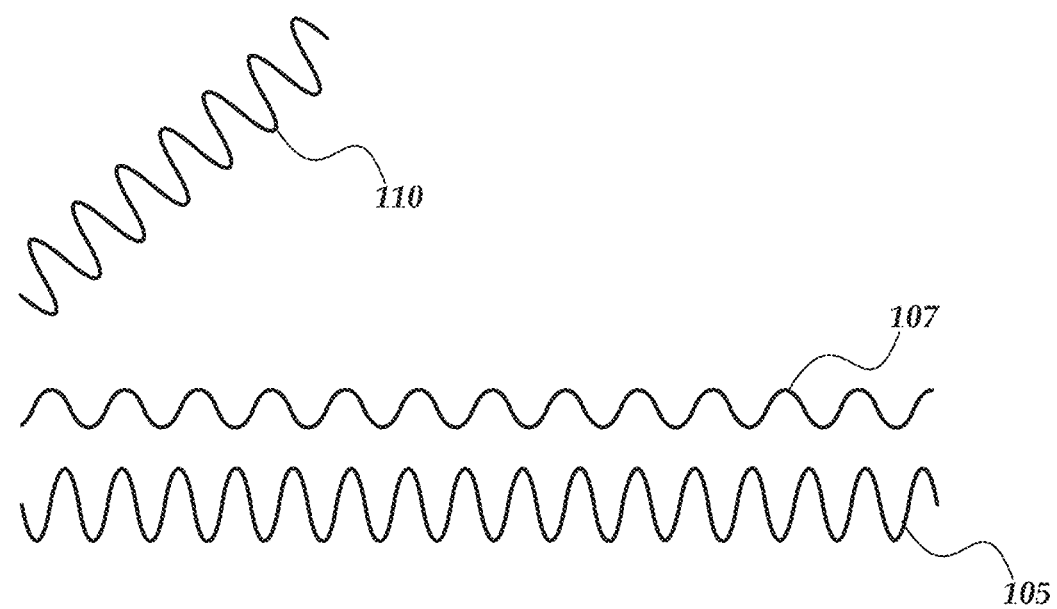
FIG. 1B shows a representation of one embodiment of a synthetic array illustrating a reference waveform and a hologram waveform (modulation function) that in combination provide an object waveform of electromagnetic waves.
Figure 1C:
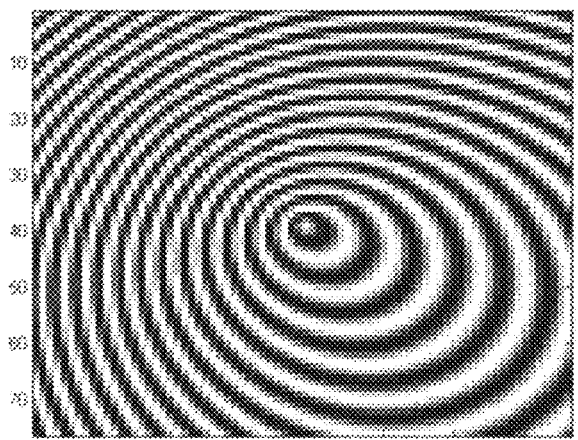
FIG. 1C shows an embodiment of an exemplary modulation function for an exemplary surface scattering antenna.
Figure 1D:
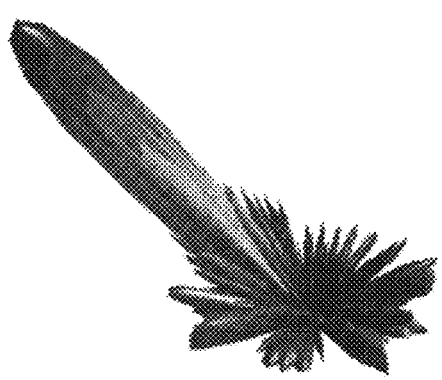
FIG. 1D shows an embodiment of an exemplary beam of electromagnetic waves generated by the modulation function of FIG. 1C.

The array of scattering elements 102a, 102b can be used to produce a far-field beam pattern that at least approximates a desired beam pattern by applying a modulation pattern 107 (e.g., a hologram function, H) to the scattering elements receiving the reference wave ($\psi_{ref}$) 105 from a reference wave source, as illustrated in FIG. 1B. Although the modulation pattern or hologram function 107 in FIG. 1B is illustrated as sinusoidal, it will be recognized non-sinusoidal functions (including non-repeating or irregular functions) may also be used. FIG. 1C illustrates one example of a modulation pattern and FIG. 1D illustrates one example of a beam generated using that modulation pattern.

In at least some embodiments, a computing system can calculate, select (for example, from a look-up table or database of modulation patterns) or otherwise determine the modulation pattern to apply to the scattering elements 102a, 102b receiving the RF energy that will result in an approximation of desired beam pattern. In at least some embodiments, a field description of a desired far-field beam pattern is provided and, using a transfer function of free space or any other suitable function, an object wave ($\psi_{obj}$) 110 at an antenna's aperture plane can be determined that results in the desired far-field beam pattern being radiated. The modulation function (e.g., hologram function) can be determined which will scatter the reference wave 105 into the object wave 110. The modulation function (e.g., hologram function) is applied to scattering elements 102a, 102b, which are excited by the reference wave 105, to form an approximation of an object wave 110 which in turn radiates from the aperture plane to at least approximately produce the desired far-field beam pattern.

In at least some embodiments, the hologram function H (i.e., the modulation function) is equal the complex conjugate of the reference wave and the object wave, i.e., $\psi_{ref}^* \psi_{obj}$. Examples of such arrays, antennas, and the like can be found at U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively or additionally, embodiments of the surface scattering antenna may be adjusted to provide a selected near field radiation profile, e.g. to provide near-field focusing or near-field nulls.

The surface scattering antenna can be considered a holographic beamformer which, at least in some embodiments, is dynamically adjustable to produce a far-field radiation pattern or beam. In some embodiments, the surface scattering antenna includes a substantially one-dimensional wave-propagating structure 104 having a substantially one-dimensional arrangement of scattering elements. In other embodiments, the surface scattering antenna includes a substantially two-dimensional wave-propagating structure 104 having a substantially two-dimensional arrangement of scattering elements. In at least some embodiments, the array of scattering elements 102a, 102b can be used to generate a narrow, directional far-field beam pattern, as illustrated, for example, in FIG. 1C. It will be understood that beams with other shapes can also be generated using the array of scattering elements 102a, 102b.

In at least some of the embodiments, the narrow far-field beam pattern can be generated using a holographic metasurface antenna (HMA) and may have a width that is 5 to 20 degrees in extent. The width of the beam pattern can be determined as the broadest extent of the beam or can be defined at a particular region of the beam, such as the width at 3 dB attenuation. Any other suitable method or definition for determining width can be used.

A wider beam pattern (also referred to as a "radiation pattern") is desirable in a number of applications, but the achievable width may be limited by, or otherwise not available using, a single HMA. Multiple instances of HMAs can be positioned in an array of HMAs to produce a wider composite far-field beam pattern. It will be recognized, however, that the individual beam patterns from the individual HMAs will often interact and change the composite far-field beam pattern so that, at least in some instances, without employing the one or more embodiments of the invention, the simple combination of the outputs of multiple instances of HMAs produces a composite far-field beam pattern that does not achieve the desired or intended configuration.

Figure 2B:
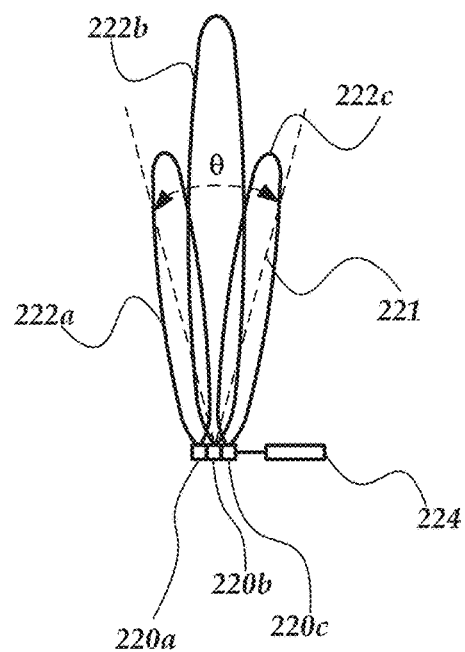
FIG. 2B shows a side view of another embodiment of an exemplary arrangement of multiple instances of HMAs.
Figure 2C:
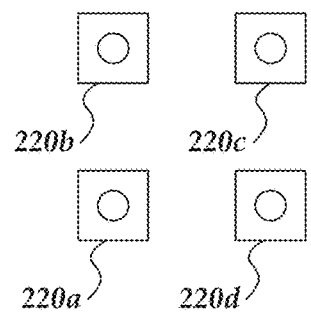
FIG. 2C shows a top view of yet another embodiment of an exemplary arrangement of multiple instances of HMAs.
Figure 2A:
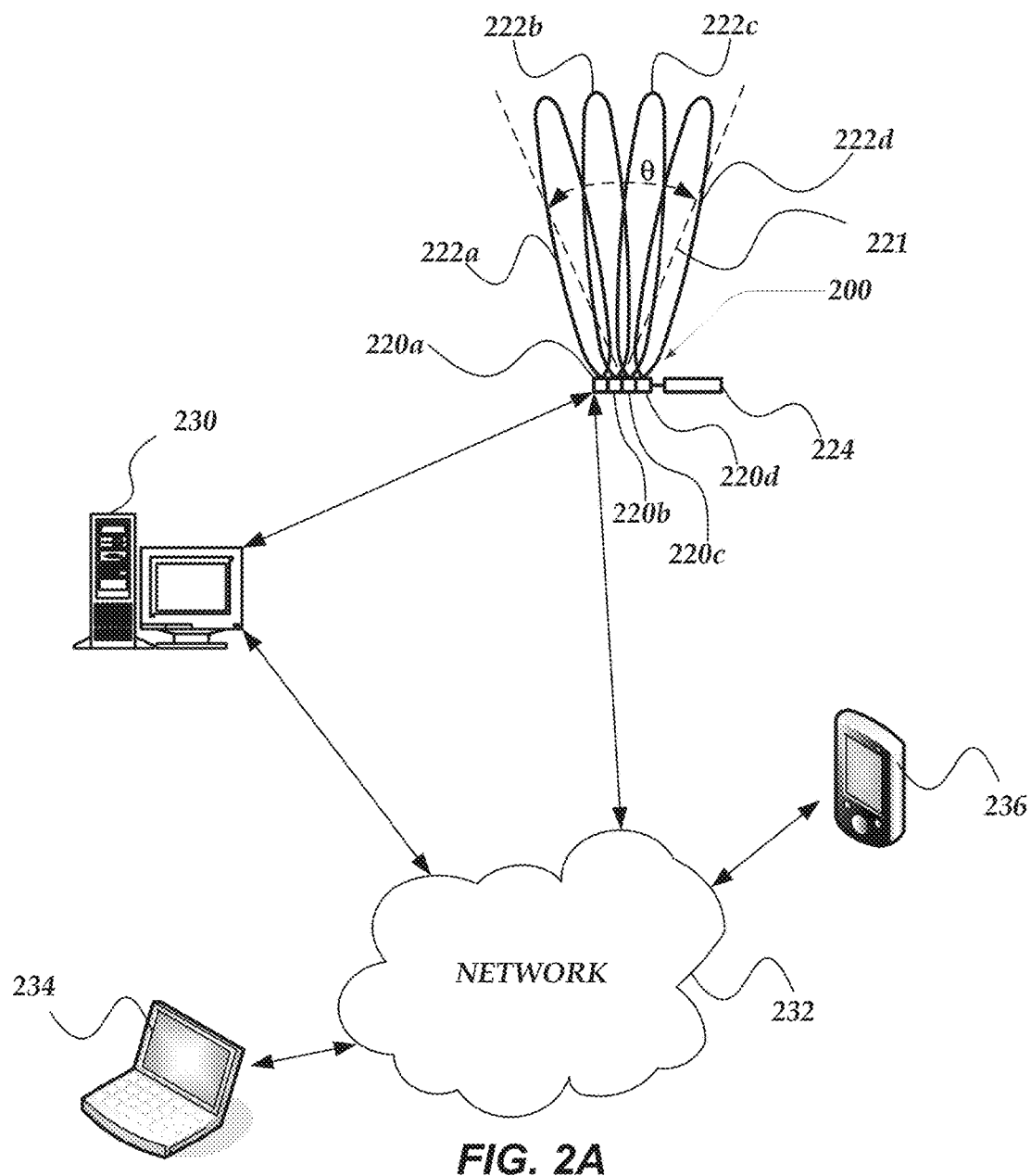
FIG. 2A shows a side view an embodiment of an exemplary environment, including an arrangement of multiple instances of HMAs propagating beams, in which various embodiments of the invention may be implemented.

FIG. 2A illustrates one embodiment of a beam-forming system 200 with an arrangement of multiple instances of HMAs (e.g., surface scattering antennas or holographic beamformers) 220a, 220b, 220c, 220d that each produce a beam 222a, 222b, 222c, 222d (i.e., a far-field radiation pattern) and are coupled to a reference wave source 224 (or multiple reference wave sources). In the illustrated example, the beams 222a, 222b, 222c, 222d are arranged to produce a coverage area 221 which, at least in some embodiments, can be described by angle θ (for example, the coverage angle at 3 Db). It will be understood that other methods of describing the desired coverage area can also be used.

The HMAs 220a, 220b, 220c, 220d may be identical in arrangement or composition of the array of scattering elements or may different in arrangement or composition of the array of scattering elements. In some embodiments, different reference waves may be provided to some or all of the HMAs. In at least some embodiments, the position or orientation of one or more of the HMAs may be adjustable relative to the other HMAs. In FIG. 2A, the illustrated arrangement of HMAs is one-dimensional and regular. It will be understood, however, that two- or three-dimensional arrangements of HMAs can also be used. In addition, these arrangements can have different shapes. Moreover, the arrangement illustrated in FIG. 2A is a regular arrangement of HMAs 220a, 220b, 220c, 220d with equidistant spacing between adjacent HMAs, but it will be understood that other arrangements may be irregular or may have different or variable spacing between adjacent HMAs. As an example, FIG. 2B illustrates another arrangement of HMAs 220a, 220b, 220c that produce beams 222a, 222b, 222c where the middle beam 222b is substantially different in size and shape from the other two beams 222a, 222c. FIG. 2C illustrates, in a top view, yet another arrangement of HMAs 220a, 220b, 220c, 220d which form a two-dimensional array.

In at least some embodiments, the system 200 includes, or is coupled to, a computer device 230 or other control device that can control one or more of the HMAs 220a, 220b, 220c 220d, the reference wave source 224, or any other components of the system, or any combination thereof. For example, the computer device 230 may be capable of dynamically changing the HMAs (e.g., dynamically alter the hologram function) to modify the beam generated using the HMA. Alternatively or additionally, the system 200 may include, or be coupled to, a network 232 which is in turn coupled to a computer device, such as computer device 234 or mobile device 236. The computer device 234 or mobile device 232 can control one or more of the HMAs 220a, 220b, 220c 220d, the reference wave source 224, or any other components of the system.

Various embodiments of a computer device 230, 234 (which may also be a mobile device 232) are described in more detail below in conjunction with FIG. 3. Briefly, however, computer device 230, 234 includes virtually various computer devices enabled to control the arrangement 200. Based on the desired beam pattern, the computer device 230, 234 may alter or otherwise modify one or more of the HMAs 220a, 220b, 220c, 220d.

Network 232 may be configured to couple network computers with other computing devices, including computer device 230, computer device 234, mobile device 236, HMAs 220a, 220b, 220c, 220d, or reference wave source 224 or any combination thereof. Network 232 may include various wired and/or wireless technologies for communicating with a remote device, such as, but not limited to, USB cable, Bluetooth®, Wi-Fi®, or the like. In some embodiments, network 232 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 232 may be enabled to employ various forms of communication technology, topology, computer-readable media, or the like, for communicating information from one electronic device to another. For example, network 232 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 232 may include various communication technologies by which information may travel between computing devices.

Network 232 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer. Such sub-networks may include mesh networks, Wireless LAN (WLAN) networks, cellular networks, or the like. In one or more of the various embodiments, the system may include more than one wireless network.

Network 232 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies. In essence, the network may include communication technologies by which information may travel between light source 104, photon receiver 106, and tracking computer device 110, as well as other computing devices not illustrated.

In various embodiments, at least a portion of network 232 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Computer Device

Figure 3:
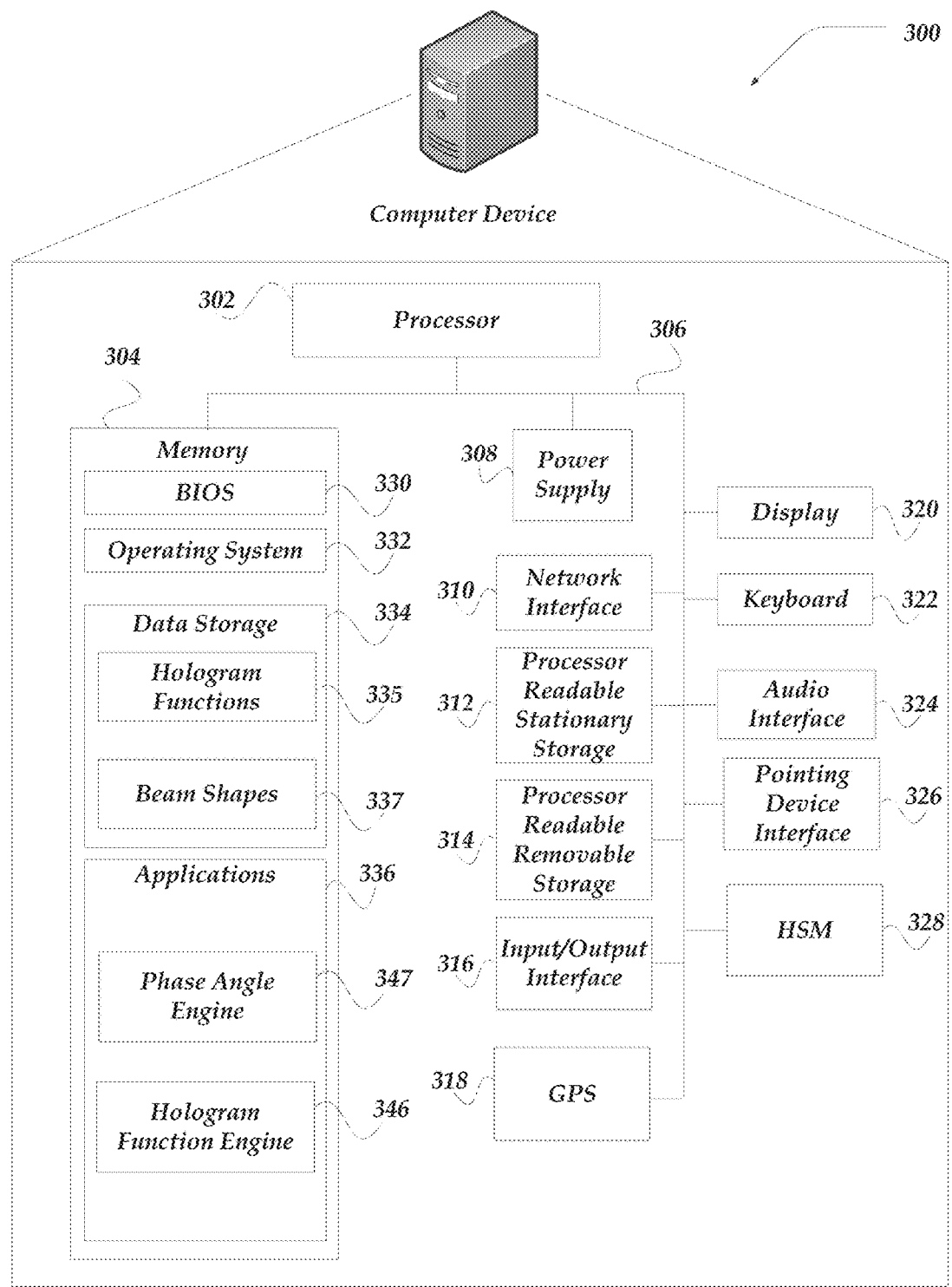
FIG. 3 shows an embodiment of an exemplary computer device that may be included in a system such as that shown in FIG. 2A.

FIG. 3 shows one embodiment of an exemplary computer device 300 that may be included in an exemplary system implementing one or more of the various embodiments. Computer device 300 may include many more or less components than those shown in FIG. 3. However, the components shown are sufficient to disclose an illustrative embodiment for practicing these innovations. Computer device 300 may include a desktop computer, a laptop computer, a server computer, a client computer, and the like. Computer device 300 may represent, for example, one embodiment of one or more of a laptop computer, smartphone/tablet, computer device 230, 234 or mobile device 236 of FIG. 2A or may be part of the system 200, such as a part of one or more of the HMAs 220a, 220b, 220c, 220d, or reference wave source 224 or the like.

As shown in FIG. 3, computer device 300 includes one or more processors 302 that may be in communication with one or more memories 304 via a bus 306. In some embodiments, one or more processors 302 may be comprised of one or more hardware processors, one or more processor cores, or one or more virtual processors. In some cases, one or more of the one or more processors may be specialized processors or electronic circuits particularly designed to perform one or more specialized actions, such as, those described herein. Computer device 300 also includes a power supply 308, network interface 310, non-transitory processor-readable stationary storage device 312 for storing data and instructions, non-transitory processor-readable removable storage device 314 for storing data and instructions, input/output interface 316, GPS transceiver 318, display 320, keyboard 322, audio interface 324, pointing device interface 326, and HSM 328, although a computer device 300 may include fewer or more components than those illustrated in FIG. 3 and described herein. Power supply 308 provides power to computer device 300.

Network interface 310 includes circuitry for coupling computer device 300 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (NIC). Computer device 300 may optionally communicate with a base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of computer device 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Computer device 300 may also comprise input/output interface 316 for communicating with external devices or computers not shown in FIG. 3. Input/output interface 316 can utilize one or more wired or wireless communication technologies, such as USB™, Firewire™, Wi-Fi™, WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to computer device 300. Human interface components can be physically separate from computer device 300, allowing for remote input and/or output to computer device 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of computer device 300. The memory also stores an operating system 332 for controlling the operation of computer device 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by computer device 300 to store, among other things, applications 336 and/or other data. For example, data storage 334 may also be employed to store information that describes various capabilities of computer device 300. In one or more of the various embodiments, data storage 334 may store hologram function information 335 or beam shape information 337. The hologram function information 335 or beam shape information 337 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of computer device 300, including, but not limited to, non-transitory media inside non-transitory processor-readable stationary storage device 312, processor-readable removable storage device 314, or various other computer-readable storage devices within computer device 300, or even external to computer device 300.

Applications 336 may include computer executable instructions which, if executed by computer device 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include hologram function engine 346 or phase angle engine 347 that performs actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, specialized applications such as hologram function engine 346 and/or phase angle engine 347 may be operative in a networked computing environment to perform specialized actions described herein. In one or more of the various embodiments, these applications, and others, may be executing within virtual machines and/or virtual servers that may be managed in a networked environment such as a local network, wide area network, or cloud-based based computing environment. In one or more of the various embodiments, in this context the applications may flow from one physical computer device within the cloud-based environment to another depending on performance and scaling considerations automatically managed by the cloud computing environment. Likewise, in one or more of the various embodiments, virtual machines and/or virtual servers dedicated to the hologram function engine 346 or phase angle engine 347 may be provisioned and de-commissioned automatically.

Also, in one or more of the various embodiments, the hologram function engine 346 or phase angle engine 347 or the like may be located in virtual servers running in a networked computing environment rather than being tied to one or more specific physical computer devices.

Further, computer device 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 328 may be a stand-alone computer device, in other cases, HSM 328 may be arranged as a hardware card that may be installed in a computer device.

Additionally, in one or more embodiments (not shown in the figures), the computer device may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the computer device may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Use Cases

As indicated above, one or more particular shapes of beam patterns, such as wide beam patterns, narrow beam patterns or composite beam patterns, may be desirable in a number of applications at different times for different conditions, but may not be practical or even available using a single HMA. In one or more embodiments, multiple instances of HMAs may be positioned in an array to produce a wide variety of composite, near-field, and/or far-field beam patterns without significant cancellation or signal loss. Since the object waves of multiple instances of HMAs may interfere with each other, adjustment to their object waves may be desirable to generate a beam pattern "closer" to the desired shape of a particular beam pattern. Any suitable methodology or metric can be used to determine the "closeness" of a beam pattern to a desired beam pattern including, but not limited to, an average deviation (or total deviation or sum of the magnitudes of deviation) over the entire beam pattern or a defined portion of the beam pattern from the desired beam pattern or the like.

In one of more embodiments, a physical arrangement of HMAs may be existing or can be constructed and coupled to a reference wave source. In one or more embodiments, a hologram function can be calculated, selected, or otherwise provided or determined for each of the HMAs. Each of the HMAs includes an array of dynamically adjustable scattering elements that have an adjustable electromagnetic response to a reference wave from the reference wave source. The hologram function for the HMA defines adjustments of the electromagnetic responses for the scattering elements of the HMA to produce an object wave that is emitted from the HMA in response to the reference wave. The object waves produced by the HMAs may be combined to produce a composite beam. Any suitable method or technique can be used to determine or provide any arrangement of HMAs to produce a composite beam, such as the exemplary composite beams illustrated in FIGS. 2A and 2B.

Figures 4, 5:
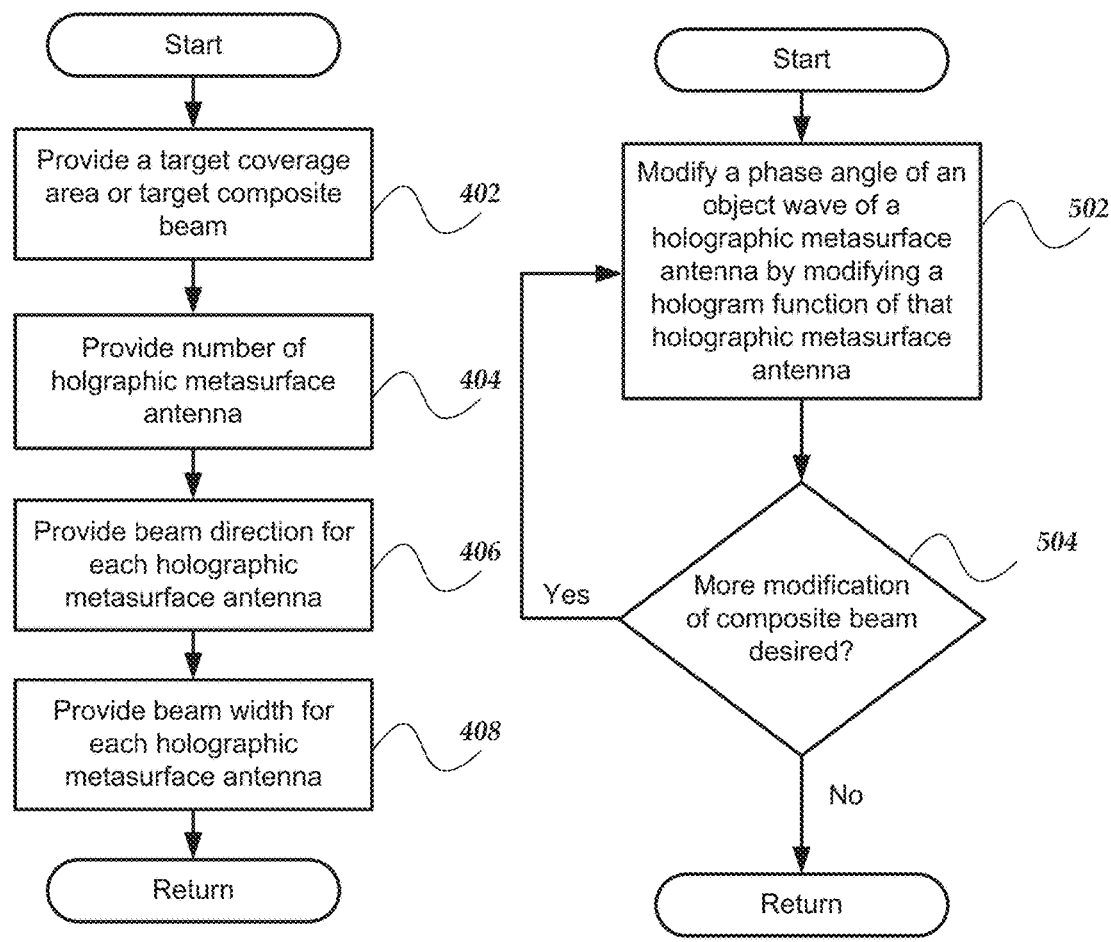
FIG. 4 shows an embodiment of a logical flow diagram for an exemplary method of forming a beam using multiple instances of HMAs.
FIG. 5 shows an embodiment of a logical flow diagram for another exemplary method of forming a beam using multiple instances of HMAs by modifying a phase angle of an object wave produced by one of the HMAs.

FIG. 4 illustrates one method for the one or more embodiments to form a composite beam produced by an arrangement of multiple instances of HMAs. In step 402, a target beam coverage area (for example, the coverage area 221 in FIGS. 2A and 2B) or target composite beam is provided or otherwise determined. In step 404, the number of HMAs is provided or otherwise determined to cover the target beam coverage area or target composite beam. In step 406, a beam direction is provided or otherwise determined for each HMA. In some embodiments, the HMAs will be selected to cover equal portions of the target beam coverage area or target composite beam and the beam directions will be distributed in a regular pattern. In other embodiments, the beam directions will be distributed in an irregular arrangement or other non-regular pattern.

In step 408, a beam width is provided or otherwise determined for each HMA. As an example, the target coverage area may be defined by an angle, $\theta$, (for example, the coverage area 221 in FIGS. 2A and 2B) and the number of apertures is N. If all of the apertures are selected to produce beams with the same or nearly the same beam width, then, at least in some embodiments, the beam width of each aperture may be equal to $\theta/N$ and the beam directions may be arranged in a regular pattern over the coverage area. In other embodiments, the beam widths of the apertures may not be equal and then the beam directions may be distributed in an irregular pattern. It will be understood that steps 402-408 provide one method of providing, determining, or selecting the number and arrangement of HMAs (e.g., holographic beamformers) but other methods of selecting the number of arrangement of HMAs can also be used. For example, one or more of the steps 402-408 may be deleted.

One difference between HMAs and other object wave sources is that the phase angle, $\phi_i$, of the object wave can be modified by modifying the hologram function, instead of, or in addition to, directly changing the phase angle of the reference wave or the object wave using a physical phase changing component. This property of the HMAs facilitates generating object waves with different phase angles (when needed) for the array of HMAs instead of, or in addition to, applying, for example, a uniform phase angle to the reference wave or set of object waves. Modifying or otherwise altering a phase angle of one or more of the object waves by altering the hologram function of one or more of the HMAs will produce a modified composite beam.

In some embodiments, an existing arrangement of HMAs is provided and a composite beam can or has been generated. It may be desirable to modify, enhance, or improve the composite beam or generate a new composite beam with a different shape. FIG. 5 illustrates one embodiment of a method of beam forming or modifying an existing beam. In step 502, a phase angle of an object wave produced by a HMA is modified by modifying a hologram function of that HMA. For example, the phase angle engine 347 of the computer device 300 of FIG. 3 can be instantiated to determine the phase angle. It will be understood that the phase angles of the object waves associated by more than one HMA can be modified simultaneously or sequentially. In at least some embodiments, only the phase angle of the object wave of one or more HMAs is modified in this step.

It will be understood that other modifications to the hologram function, beyond simply altering the phase angle of the object wave, may be performed. Also, changes to the reference wave or changes to the phase angle of the reference wave or one or more of the object waves using a physical component may also be performed as part of the method.

In step 504, a decision is made whether more modification of the composite beam is desired. If yes, then step 502 is repeated to modify the phase angle of the object wave(s) associated with the same HMA or a different HMA or any combination of HMAs.

Although not bound by any particular theory, in at least some embodiments, the composite far-field beam pattern (or radiation pattern), $R_{comp}$, of the array of HMAs (e.g., holographic beamformers) can be described by the following equation:

$$R_{comp} = R_1 AF_1 + R_2 AF_2 + R_3 AF_3 + \ldots$$

where, for a given HMA i, $R_i$ is the radiation pattern for the HMA and $AF_i$ is an array factor for the HMA. In at least some embodiments, the array factor is described by the following equation $AF_i = w_i e^{-j\phi_i} e^{-jk_i \cdot r_i}$, where $w_i$ is an optional weighting factor for the HMA (relative to other HMAs), $k_i$ is the wave vector for the HMA, $r_i$ is the location of the HMA, and $\phi_i$ is a relative phase angle. The component, $R_i AF_i$, for the $i^{th}$ HMA can be used to determine the hologram function, $H_i$ that produces the beam pattern. In at least some embodiments, a field description of the far-field beam or radiation pattern is used with a transfer function of free space to determine an object wave at an antenna's aperture plane is determined that results in the desired far-field beam pattern being radiated. The hologram function is then determined which will scatter the reference wave into the object wave. Conversely, the hologram function, $H_i$, can be modified to modify $R_i AF_i$.

Figure 6:
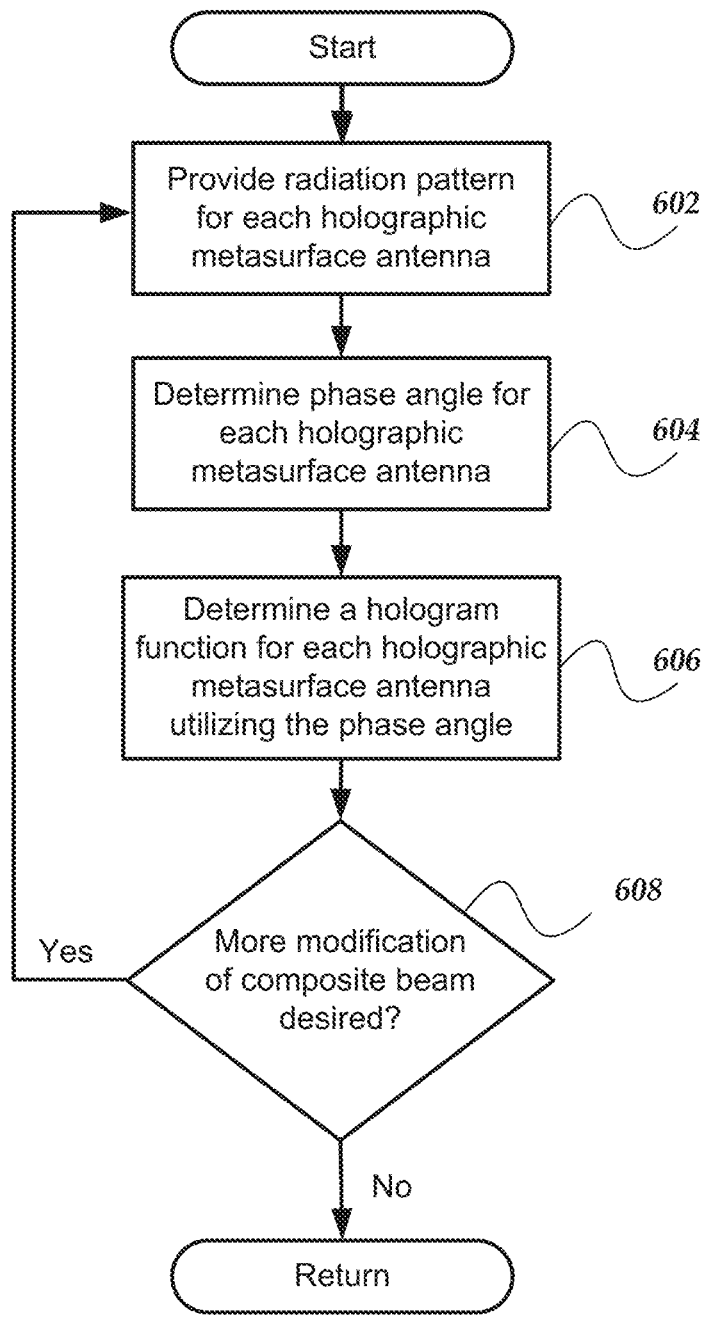
FIG. 6 shows an embodiment of a logical flow diagram for yet another exemplary method of forming a beam using multiple instances of HMAs by modifying a phase angle of an object wave produced by one of the HMAs.

FIG. 6 illustrates another embodiment of a method for beam forming. The method utilizes an arrangement of HMAs such as that generated using the steps illustrated in FIG. 4. In step 602, a radiation pattern is provided, calculated, or otherwise determined for each HMA and from these radiation patterns a composite beam (or composite beam pattern or composite radiation pattern) for the array of HMAs is also determinable. In at least some embodiments, the radiation pattern is determined using the hologram function, $H_i$. The hologram functions may be a function of the beam direction, r, beam width, bw, and phase angle, $\phi$, for example, $H_i(r_i, bw_i, \phi_i)$. The phase angle may be set to zero (for example, $H_i(r_i, bw_i, 0)$ or any other value or may have an arbitrary value. In some embodiments, one or more processors may compute the hologram function using the methods described herein or any other suitable method. Alternatively, one or more processors may select a pre-computed hologram function from a library or look-up table (or the like) of hologram functions. In some embodiments, the hologram function may be determined as part of step 602. For example, the hologram function engine 346 of the computer device 300 of FIG. 3 can be instantiated to determine the hologram function, for example, $H_i(r_i, bw_i, 0)$ for each of the HMAs.

In step 604, phase angles for each of the HMAs are determined using the radiation patterns. For example, the phase angle engine 347 of the computer device 300 of FIG. 3 can be instantiated to determine the phase angle. Although not relying on any particular theory, in at least some embodiments, the following equation can be used to determine the phase angles:

$$R_{comp} = R_1 AF_1 + R_2 AF_2 + R_3 AF_3 + \ldots$$

In this instance, $R_{comp}$ is the desired composite radiation pattern (or composite beam or composite beam pattern) and $R_i$ is the radiation pattern for the $i^{th}$ HMA as determined in step 602 (for example, the radiation pattern, $R_i$, corresponding to each hologram function $H_i(r_i, bw_i, 0)$ with a phase angle of 0.) The term $AF_i$ is the array factor for the $i^{th}$ HMA where $AF_i = w_i e^{-j\phi_i} e^{-jk_i \cdot r_i}$. With the provided or determined radiation patterns from step 602, the phase angles, $\phi_1$, $\phi_2$, ..., can be determined by fitting to $R_{comp}$. Any suitable method of determining the phase angles and fitting to $R_{comp}$ can be used.

In step 606, revised hologram functions, $H_i(r_i, bw_i, \phi_i)$ for each HMA can then be determined using the phase angles determined in step 604. For example, the hologram function engine 346 of the computer device 300 of FIG. 3 can be instantiated to determine the hologram function, $H_i(r_i, bw_i, \phi_i)$. In some embodiments, one or more processors may compute the revised hologram function using the methods described herein or any other suitable method. Alternatively, one or more processors may select a pre-computed hologram function, $H_i(r_i, bw_i, \phi_i)$, from a library or look-up table (or the like) of hologram functions.

In at least some embodiments, steps 602 to 606 can be repeated recursively to fine tune the phase angles and hologram functions as indicated by the decision in step 608 of whether further modification of the composite beam is desired. Alternatively or additionally, the hologram functions or phase angles may be optionally modified through testing or using additional information, operator experience, or the like to further refine the composite beam produced by the array of HMAs. It will be understood that other modifications to the hologram function, beyond simply altering the phase angle of the object wave, may be performed. Also, changes to the reference wave or changes to the phase angle of the reference wave or one or more of the object waves using a physical component may also be performed as part of the method.

The processes illustrated in FIG. 4, 5, or 6 or a subset of the processes can be performed periodically to maintain the desired composite beam or when the desired composite beam is altered. The processes illustrated in FIG. 4, 5, or 6 may be repeated for different target composite beams. For example, a first target composite beam may be selected for a first period of time and the process illustrated in FIG. 4, 5, or 6 is performed to obtain a first composite beam that replicates the target composite beam (for example, to at least a threshold level of accuracy). Later, a second target composite beam may be selected for a second period of time and the process illustrated in FIG. 4 or 5 is repeated to obtain a second composite beam that replicates the target composite beam. Additionally, the processes of FIGS. 4, 5 and 6 may be performed by one or more of the phase angle engine, the hologram function engine, applications, other engines, modules, and/or platforms.

It will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the invention. Since many embodiments of the invention can be made without departing from the spirit and scope of the invention, the invention resides in the claims hereinafter appended.

What is claimed as new and desired to be protected by Letters Patent of the United States is:

1. A method for beam forming, wherein a computer executes instructions for the method by one or more processors to perform actions, comprising:
   providing a physical arrangement a plurality of holographic metasurface antennas (HMAs) and one or more wave sources coupled to the HMAs, wherein each of the HMAs comprises a physically separate housing and an array of scattering elements that are dynamically adjustable in response to one or more waves provided by the one or more wave sources;
   instantiating a hologram function engine to perform further actions, including:
      determining a first hologram function for each of the HMAs, wherein the first hologram function is employed by each of the HMAs to adjust each response of each scattering element to produce a first object wave having a first phase angle that is emitted in response to a reference wave provided by the one or more wave sources, wherein a combination of the emitted first object waves form a first composite beam having a selected strength and shape at a predetermined distance; and
   instantiating a phase angle engine to perform further actions, including:
      recursively determining a second phase angle for each of the HMAs in the physical arrangement by changing the first phase angle of the first hologram function of an HMA relative to the first phase angle of the first hologram function of a next HMA to provide coherency between second object waves correspondingly emitted by the HMA and the next HMA until each second phase angle is determined for each of the HMAs, wherein the hologram function engine determines a second hologram function that incorporates the determined second phase angle for each HMA; and
   wherein the physical arrangement of the plurality of HMAs emits a second composite wave based on each second object wave emitted by each of the HMAs, and wherein each of the HMAs uses its corresponding second hologram function to emit its corresponding second object wave to produce, in combination, the second composite beam.

2. The method of claim 1, wherein the hologram function engine performs further actions comprising employing a predetermined width of the first composite beam to determine the first hologram functions for the HMAs.

3. The method of claim 1, wherein the hologram function engine performs further actions comprising employing a predetermined strength at a predetermined distance for the first composite beam to determine the first hologram functions of the HMAs.

4. The method of claim 1, wherein the hologram function engine performs further actions, comprising:
   providing a library of target composite beams, wherein each target waveform includes one or more target hologram functions; and
   when one of the target composite beams is selected, providing the one or more corresponding target hologram functions as the first hologram function for the HMAs.

5. The method of claim 1, wherein one or more of the second phase angles are different from each other.

6. The method of claim 1, wherein the first object waves from the HMAs are spatially shifted relative to each other and otherwise differ in the first phase angles of the first object waves.

7. The method of claim 1, wherein the hologram function engine performs further actions, comprising:
   determining a radiation pattern for each hologram function using an equation, $H_i(r_i, bw_i, \phi_i)$, as a function of beam direction, r, beam width, bw, and phase angle, $\phi$, wherein each first hologram function is based on each first phase angle being set to a known value, and wherein each second hologram function is based on each second phase angle being determined by the phase angle engine.

8. The method of claim 1, wherein the phase angle engine to perform further actions, including:
   recursively determining a third phase angle for each of the HMAs in the physical arrangement based on feedback regarding one or more properties of the second composite beam, wherein the hologram function engine determines a third hologram function that incorporates the determined third phase angle for each HMA; and
   wherein the physical arrangement of HMAs emits a third composite wave based on a third object wave for each of the HMAs, and wherein each of the HMAs uses its corresponding third hologram function to emit its corresponding third object wave to produce the third composite beam.

9. The method of claim 1, wherein the phase angle engine performs further actions, comprising:
   receiving a target coverage area;
   receiving a beam direction for each of the HMAs;
   receiving a beam width for each of the HMAs; and
   arranging the HMAs and the beam directions to cover the target coverage area.

10. The method of claim 1, wherein the phase angle engine performs further actions, comprising:
determining, for each of the HMAs, a radiation pattern using the first hologram function for the HMA; and
wherein determining the second phase angle comprises determining the first phase angle for each of the HMAs using one or more of the radiation pattern or an array factor for each of the HMAs.

11. A system for forming a beam, comprising:
one or more wave sources;
a plurality of holographic metasurface antennas (HMAs) coupled to the one or more wave sources, wherein each of the HMAs comprises a physically separate housing and an array of scattering elements that are dynamically adjustable in response to one or more waves provided by the one or more wave sources;
a computer, including:
a memory for storing instructions;
one or more processors that execute the instructions to perform actions, comprising:
instantiating a hologram function engine to perform further actions, including:
determining a first hologram function for each of the HMAs, wherein the first hologram function is employed by each of the HMAs to adjust each response of each scattering element to produce a first object wave having a first phase angle that is emitted in response to a reference wave provided by the one or more wave sources, wherein a combination of the emitted first object waves form a first composite beam having a selected strength and shape at a predetermined distance; and
instantiating a phase angle engine to perform further actions, including:
recursively determining a second phase angle for each of the HMAs in the physical arrangement by changing the first phase angle of the first hologram function of an HMA relative to the first phase angle of the first hologram function of a next HMA to provide coherency between second object waves correspondingly emitted by the HMA and the next HMA until each second phase angle is determined for each of the HMAs, wherein the hologram function engine determines a second hologram function that incorporates the determined second phase angle for each HMA; and
wherein the physical arrangement of the plurality of HMAs emits a second composite wave based on each second object wave emitted by each of the HMAs, and wherein each of the HMAs uses its corresponding second hologram function to emit its corresponding second object wave to produce, in combination, the second composite beam.

12. The system of claim 11, wherein the hologram function engine performs further actions comprising employing a predetermined width of the first composite beam to determine the first hologram functions for the HMAs.

13. The system of claim 11, wherein the hologram function engine performs further actions comprising employing a predetermined strength at a predetermined distance for the first composite beam to determine the first hologram functions of the HMAs.

14. The system of claim 11, wherein the hologram function engine performs further actions, comprising:
providing a library of target composite beams, wherein each target waveform includes one or more target hologram functions; and
when one of the target composite beams is selected, providing the one or more corresponding target hologram functions as the first hologram function for the HMAs.

15. The system of claim 11, wherein one or more of the second phase angles are different from each other.

16. The system of claim 11, wherein the first object waves from the HMAs are spatially shifted relative to each other and otherwise differ in the first phase angles of the first object waves.

17. The system of claim 11, wherein the hologram function engine performs further actions, comprising:
determining a radiation pattern of radiation for each hologram function using an equation, $H_i(r_i, bw_i, \phi_i)$, as a function of beam direction, r, beam width, bw, and phase angle, $\phi$, wherein each first hologram function is based on each first phase angle being set to a known value, and wherein each second hologram function is based on each second phase angle being determined by the phase angle engine.

18. The system of claim 11, wherein the phase angle engine to perform further actions, including:
recursively determining a third phase angle for each of the HMAs in the physical arrangement based on feedback regarding one or more properties of the second composite beam, wherein the hologram function engine determines a third hologram function that incorporates the determined third phase angle for each HMA; and
wherein the physical arrangement of HMAs emits a third composite wave based on a third object wave for each of the HMAs, and wherein each of the HMAs uses its corresponding third hologram function to emit its corresponding third object wave to produce the third composite beam.

19. The system of claim 11, wherein the phase angle engine performs further actions, comprising:
receiving a target coverage area;
receiving a beam direction for each of the HMAs;
receiving a beam width for each of the HMAs; and
arranging the HMAs and the beam directions to cover the target coverage area.

20. The system of claim 11, wherein the phase angle engine performs further actions, comprising:
determining, for each of the HMAs, a radiation pattern using the first hologram function for the HMA; and
wherein determining the second phase angle comprises determining the first phase angle for each of the HMAs using one or more of the radiation pattern or an array factor for each of the HMAs.

21. A non-transitory processor readable storage media that includes instructions for forming a beam, wherein a computer executes the instructions by one or more processor devices to perform actions, comprising:
providing a physical arrangement of a plurality of holographic metasurface antennas (HMAs) one or more wave sources coupled to the HMAs, wherein each of the HMAs comprises a physically separate housing and an array of scattering elements that are dynamically adjustable in response to one or more waves provided by the one or more wave sources;
instantiating a hologram function engine to perform further actions, including:
determining a first hologram function for each of the HMAs, wherein the first hologram function is employed by each of the HMAs to adjust each response of each scattering element to produce a first object wave having a first phase angle that is emitted in response to a reference wave provided by the one or more wave sources, wherein a combination of the emitted first object waves form a first composite beam having a selected strength and shape at a predetermined distance; and instantiating a phase angle engine to perform further actions, including:
recursively determining a second phase angle for each of the HMAs in the physical arrangement by changing the first phase angle of the first hologram function of an HMA relative to the first phase angle of the first hologram function of a next HMA to provide coherency between second object waves correspondingly emitted by the HMA and the next HMA until each second phase angle is determined for each of the HMAs, wherein the hologram function engine determines a second hologram function that incorporates the determined second phase angle for each HMA; and wherein the physical arrangement of the plurality of HMAs emits a second composite wave based on each second object wave emitted by each of the HMAs, and wherein each of the HMAs uses its corresponding second hologram function to emit its corresponding second object wave to produce, in combination, the second composite beam.

22. The media of claim 21, wherein the hologram function engine performs further actions comprising employing a predetermined width of the first composite beam to determine the first hologram functions for the HMAs.

23. The media of claim 21, wherein the hologram function engine performs further actions comprising employing a predetermined strength at a predetermined distance for the first composite beam to determine the first hologram functions of the HMAs.

24. The media of claim 21, wherein the hologram function engine performs further actions, comprising:
providing a library of target composite beams, wherein each target waveform includes one or more target hologram functions; and
when one of the target composite beams is selected, providing the one or more corresponding target hologram functions as the first hologram function for the HMAs.

25. The media of claim 21, wherein one or more of the second phase angles are different from each other.

26. The media of claim 21, wherein the first object waves from the HMAs are spatially shifted relative to each other and otherwise differ in the first phase angles of the first object waves.

27. The media of claim 21, wherein the hologram function engine performs further actions, comprising:
determining a radiation pattern for each hologram function using an equation, $H_i(r_i, bw_i, \phi_i)$, as a function of beam direction, r, beam width, bw, and phase angle, $\phi$, wherein each first hologram function is based on each first phase angle being set to a known value, and wherein each second hologram function is based on each second phase angle being determined by the phase angle engine.

28. The media of claim 21, wherein the phase angle engine to perform further actions, including:
recursively determining a third phase angle for each of the HMAs in the physical arrangement based on feedback regarding one or more properties of the second composite beam, wherein the hologram function engine determines a third hologram function that incorporates the determined third phase angle for each HMA; and
wherein the physical arrangement of HMAs emits a third composite wave based on a third object wave for each of the HMAs, and wherein each of the HMAs uses its corresponding third hologram function to emit its corresponding third object wave to produce the third composite beam.

29. The media of claim 21, wherein the phase angle engine performs further actions, comprising:
receiving a target coverage area;
receiving a beam direction for each of the HMAs;
receiving a beam width for each of the HMAs; and
arranging the HMAs and the beam directions to cover the target coverage area.

30. The media of claim 21, wherein the phase angle engine performs further actions, comprising:
determining, for each of the HMAs, a radiation pattern using the first hologram function for the HMA; and
wherein determining the second phase angle comprises determining the first phase angle for each of the HMAs using one or more of the radiation pattern or an array factor for each of the HMAs.

* * * * *